Figure 1:
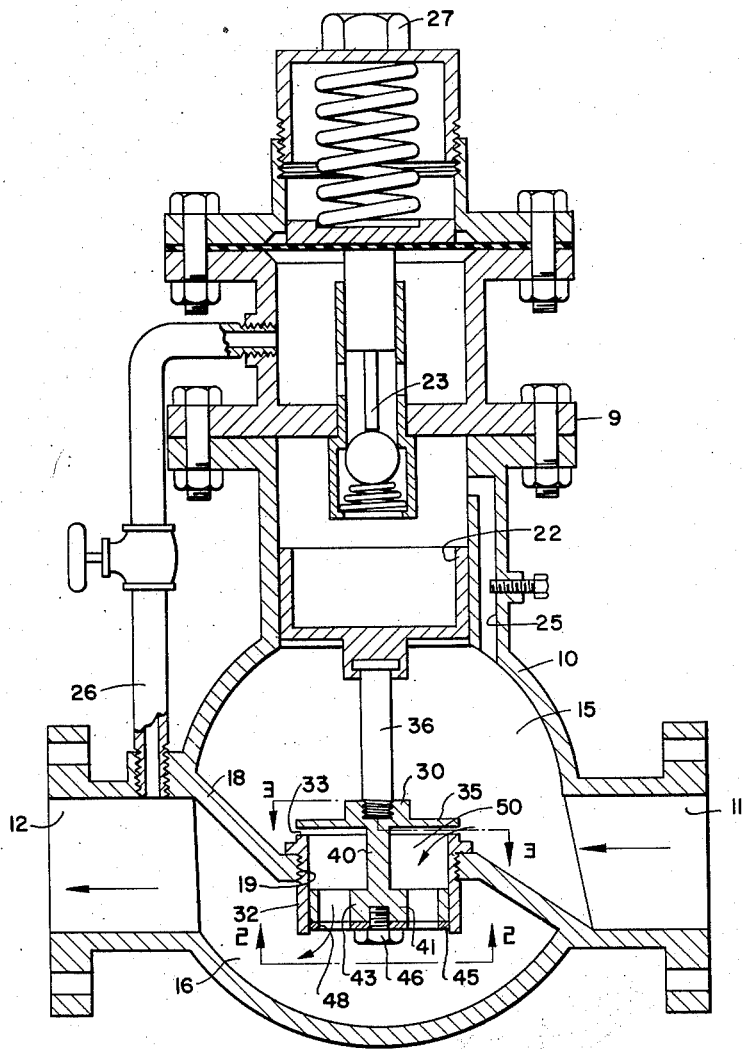

Sept. 6, 1960 E. SINGER 2,951,499
PRESSURE AND CAPACITY REGULATING VALVE
Filed May 6, 1955. 3 Sheets-Sheet 2
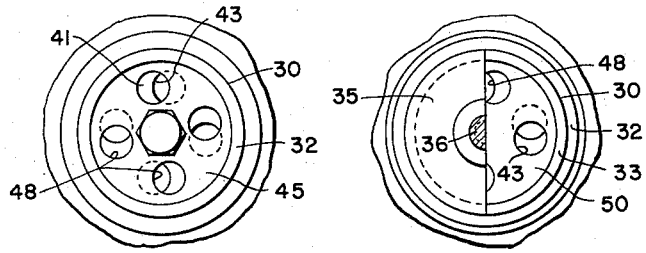
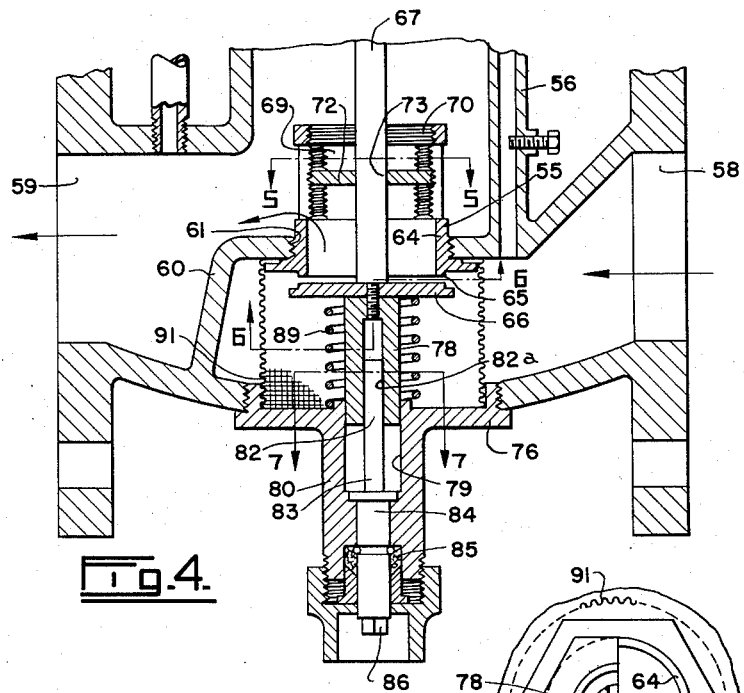
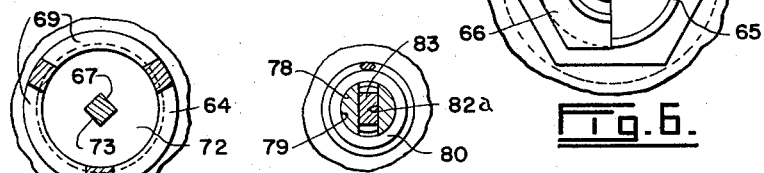
INVENTOR
ERNST SINGER
BY
Fetherstonhaugh & Co.
ATTORNEYS Sept. 6, 1960   E. SINGER   2,951,499
PRESSURE AND CAPACITY REGULATING VALVE
Filed May 6, 1955   3 Sheets-Sheet 3

INVENTOR
ERNST SINGER
BY
Fetherstonhaugh & Co.
ATTORNEYS

United States Patent Office 2,951,499
Patented Sept. 6, 1960

2,951,499

PRESSURE AND CAPACITY REGULATING VALVE

Ernst Singer, Vancouver, British Columbia, Canada, assignor to Singer Valve Company Limited, Vancouver, British Columbia, Canada, a corporation of British Columbia, Canada Filed May 6, 1955, Ser. No. 506,640

3 Claims. (Cl. 137—489)

This invention relates to combined pressure and capacity regulating fluid valves.

This application is a continuation-in-part of my United States patent application Serial Number 445,551, filed July 26, 1954, now abandoned.

There are many fluid pressure reducing valves in existence, but the range of most of these is rather limited. If a large drop in pressure is required, it is usually necessary to use two or more of the known valves so that the pressure is reduced in stages. Furthermore, there are many valves capable of delivering a desired quantity of fluid within a given time. The capacity may be estimated in pounds per hour or in cubic feet per hour. However, with these known types, when it is desired to change the capacity, it is necessary to change the entire valve or to change what is commonly known as the inner valve, that is, the part of the valve which actually determines the capacity.

The main purpose of the present invention is the provision of a single pressure and capacity regulating valve. This valve is capable of reducing the pressure of the fluid to any desired point, and of controlling the amount of fluid passing therethrough in a given time to regulate the capacity of the valve independently of the regulated pressure.

Another important object is the elimination of wire drawing in a valve seat. Wire drawing (grooving of seat) is caused by fluid passing at high speeds through a very narrow space between the valve and its seat. This control valve may be so adjusted that the valve does not remain in a position close to the seat thereof. This also eliminates chatter.

The present valve is capable of reducing the fluid pressure to any reasonable desired point because this is done in two stages within the valve itself. The outlet pressure may be adjusted at will, and the capacity of the valve may be altered as desired. In addition to this, the valve may be adjusted to change the pressure with or without altering the capacity, and vice versa.

This invention is applied to valves having bodies with inner valves therein. The valve body includes standard means for regulating and maintaining the outlet pressure. The present inner valve includes the actual parts that are so controlled in determining and maintaining the outlet pressure, and it also includes means for adjusting the capacity. Thus, when the outlet pressure of the valve is changed, the capacity adjusting means may be manipulated to maintain the same capacity or to change said capacity. Although the pressure regulating and capacity regulating means work in conjunction with each other, still each one can do its job regardless of the setting of the other.

A pressure and capacity regulating inner valve according to this invention comprises a seat within a valve body, through which fluid flows from the inlet to the outlet of the latter. Valve means at the seat is connected to the standard moving means of the valve for reducing the outlet pressure. This valve means is moved towards and away from the seat to regulate and maintain the outlet pressure. Adjustable means is provided near the seat for controlling the amount of fluid passing through said seat in a given time to regulate the capacity of the valve independently of the regulated pressure. This adjusting means includes opening means near the seat through which fluid flows, and means for adjusting the effective size of the opening means.

Figure 8:
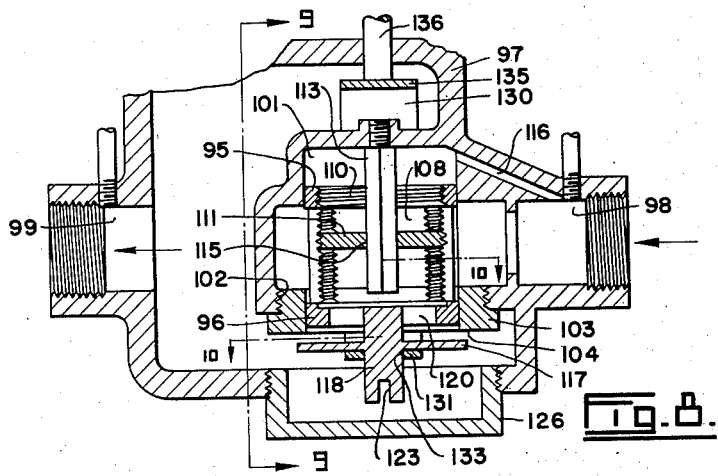
Figure 9:
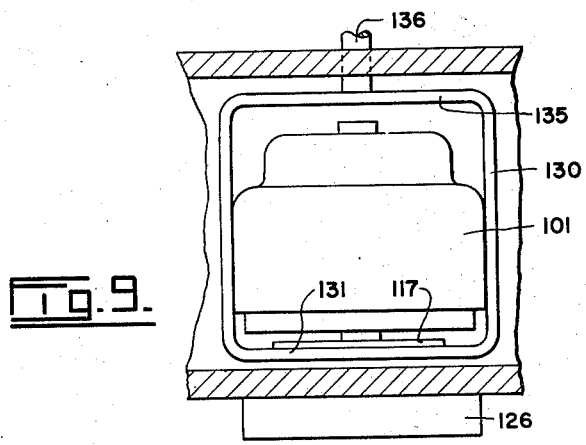
Figure 10:
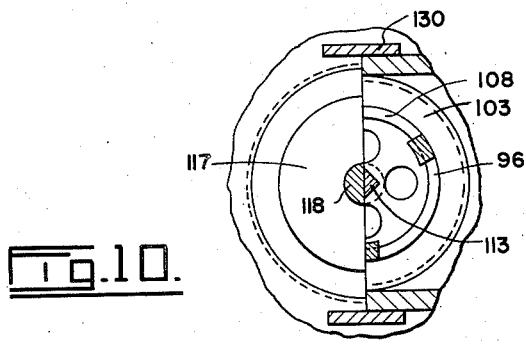

Examples of this invention are illustrated in the accompanying drawings, in which, Figure 1 is a vertical section through a standard control valve including the present pressure and capacity regulating inner valve, Figure 2 is a fragmentary bottom plan view of the inner valve, Figure 3 is a horizontal section taken substantially on the line 3—3 of Figure 1, Figure 4 is a fragmentary sectional view similar to Figure 1 through a standard valve illustrating an alternative form of inner valve, Figure 5 is a horizontal section taken on the line 5—5 of Figure 4, Figure 6 is a horizontal section taken on the line 6—6 of Figure 4, Figure 7 is a horizontal section taken on the line 7—7 of Figure 4, Figure 8 is a view similar to Figure 4 showing another form of inner valve, Figure 9 is a vertical sectional view taken on the line 9—9 of Figure 8 and Figure 10 is a horizontal sectional view taken on the line 10—10 of Figure 8.

Referring to Figures 1 to 3 of the drawings, 9 is a control valve having a body 10 with an inlet 11 and an outlet 12 therein. The inlet communicates with a valve chamber 15, while the outlet communicates with an expansion chamber 16. These chambers are separated by a central wall or partition 18 having a threaded orifice 19 therein.

In valves of this type, the outlet pressure is adjusted and maintained by suitable moving means, such as a piston, diaphragm, electrical means, and the like. In this example, a piston 22 is provided for this purpose, said piston being operated and controlled by inlet and outlet fluid pressures. The actual control mechanism is indicated at 23, but as this is standard practice and well known in the art, it does not need detailed description herein. The inlet pressure is directed to the mechanism through a passage 25, while the outlet pressure is made available through pipe 26. The outlet pressure is adjusted by turning the nut or head 27. The adjusting of this head determines the outlet pressure, and the floating piston 22 maintains the selected pressure regardless of fluctuations in the inlet pressure.

The inner valve of valve body 10 is generally designated by the numeral 30. In the form of inner valve illustrated in Figures 1 to 3, said valve comprises a sleeve 32 having a seat 33 at one end thereof, through which fluid flows from the inlet 11 to the outlet 12. Valve means in the form of a valve plate 35 is located at the seat. This plate is connected to the moving means or piston 22 for movement therewith in any desired manner, such as, by means of a stem 36 connected at its opposite ends to the piston and the plate.

With this arrangement, when the head 27 is turned, the valve plate 35 is moved towards or away from the seat 33 to adjust the degree of pressure drop across said seat.

A stem 40 extends from the valve plate 35 centrally through sleeve 32 and has a wall 41 mounted on its lower end. This wall extends across the sleeve and is slidably mounted therein at the end thereof remote from seat 33. The wall floats with the valve plate, and has a plurality of ports 43 therein. A capacity plate 45 bears against and is rotatably mounted on the wall by means of a stud 46 which extends through the plate and is threaded into the wall. This plate has a plurality of openings 48 therein, usually one for each port 43. The ports and openings are located around the stud 46, see Figure 2, so that the plate may be rotated gradually to bring the openings into and out of registry with the ports to adjust the effective size of the latter.

The area between the valve plate and wall 41 is an inner or primary expansion chamber 50.

In operation, the fluid, say for example, steam, enters chamber 15 of valve body 10 through the inlet 11. The fluid passes between seat 33 and plate 35 into the expansion chamber 50. There is a certain pressure drop across the seat. The fluid then passes through the registering ports 43 and openings 48 into the expansion chamber 16, and there is a second pressure drop across the ports and openings. In order to obtain a desired outlet pressure, the valve plate is moved towards or away from the seat by turning nut 27. The capacity of the valve is adjusted by rotating plate 45 to adjust the effective size of ports 43. Thus, it will be seen that the pressure and the capacity of the valve may be adjusted independently of each other. If the outlet pressure is changed, and it is desired to maintain the same capacity, it may be necessary to adjust the capacity plate in order to maintain that capacity, or if the capacity is changed, and it is desired to maintain the same pressure, it may be necessary to adjust the valve plate.

If the control valve has been set for a desired outlet pressure and capacity and it is found that chattering is caused by the valve plate being too close to its seat, said plate may be moved away from the seat to eliminate the chattering, and then the capacity plate rotated to reduce the effective size of the ports in order to restore the outlet pressure and capacity. From this it will be seen that the capacity plate makes it possible to keep the valve plate away from its seat to prevent wire drawing therein.

Figures 4 to 7 illustrate an alternative form of inner valve 55 mounted in a valve body 56 which is similar in construction to the body of valve 9. Body 56 has an inlet 58, an outlet 59, and a central wall or partition 60 having an orifice 61 therein in which the inner valve is located.

The inner valve comprises a sleeve 64 having a seat 65 at one end which is overlapped by a valve plate 66, said plate being connected to a stem 67 that extends upwardly through the sleeve to a floating piston or the like, not shown. A plurality of elongated ports 69 are formed in the wall of the sleeve near the end thereof remote from the valve plate. Said ports extending longitudinally of the sleeve and terminating above the partition 60, see Figure 4. The ported end of the sleeve is internally threaded as indicated at 70. A capacity plate 72 is threaded in the ported end of the sleeve and the stem 67 extends therethrough. The stem is slidably connected to the capacity plate in any desired manner. In this example, the stem is rectangular in cross section and slidably extends through a correspondingly-shaped hole 73 in the plate centrally thereof. With this arrangement, the stem is free to move up and down through the plate, and rotational movement of the stem turns the plate with it. This causes the plate to move up or down within the sleeve to adjust the effective size of the ports 69, the effective portions of said ports being those between the plate and the seat end of the sleeve.

The stem 67 may be turned to rotate the capacity plate by opening up the valve and turning valve plate 66. However, it is desirable to provide means for turning said stem which may be operated from outside the valve. For this purpose, valve 56 may be provided with a plug 76 removably mounted in the bottom thereof. A fork 78 is secured to the underside of valve plate 66 and extends downwardly therefrom, the lower end of said fork slidably fitting in a cavity 79 formed within a projection 80 extending downwardly from the plug. Fork 78 has a slot 82 in the lower end thereof having flat sides 82a, slidably to receive a stem 83 with flat sides bearing against those of the fork. This stem projects upwardly from a cylindrical member 84 extending through a packing gland 85 carried by the outer end of projection 80, said member having a squared head 86 on its outer or lower end. When the stem 83 is turned by rotating head 86, fork 78 and valve plate 66 turn with it. This turns stem 67 and rotates the capacity plate 72 to move it up or down, depending upon the direction of the turning movement, to adjust the effective size of the ports 69.

If desired, a spring 89 may extend from plug 76 to the valve plate in order to urge the latter upwardly. This stem surrounds fork 78. Furthermore, a cylindrical strainer screen 91 may surround the valve plate and the associated parts therebelow, said screen extending upwardly from the plug to the partition 60 around the inner valve.

The valve of Figures 4 to 7 operates in the same manner as that of Figure 1. The nut (not shown) at the top of valve 56 is turned to adjust the floating piston thereof upwardly or downwardly. During this adjustment the valve plate 66 moves towards or away from the seat 65 to adjust the outlet pressure of the valve. This pressure is maintained in the usual manner. The capacity of the valve is adjusted by turning head 86 to move the capacity plate up or down within sleeve 64. As stated above, this adjusts the effective size of ports 69 thereby regulating the amount of fluid that will pass through the valve within a given time. Furthermore, the valve and capacity plates may be adjusted relative to each other to keep the valve plate away from its seat.

It is obvious that the capacity plate of Figure 1 may be adjusted from outside the valve body by mechanism similar to that of Figure 4.

Figures 8 to 10 illustrate another alternative form of inner valve 95, said valve being mounted in a valve body 97. This valve is similar to valve 10 of Figure 1, and has a floating pressure-controlling piston or the like which may be adjusted up and down by a nut or head. As these are standard elements, they have not been illustrated in these figures. Body 97 has an inlet 98, and an outlet 99. The inlet communicates with a housing 101 formed within body 97 and having an outlet 102 in which the inner valve is mounted.

Inner valve 95 comprises a sleeve 96 which is slidably mounted within a ring 103 having a face or seat 104 facing downwardly. This ring is threaded in the housing opening 102. The seat 104 is at or near the lower end of sleeve 96. This sleeve is formed with a plurality of elongated ports 108 extending longitudinally thereof near the end of said sleeve remote from the seat 104. In this example, the ports extend longitudinally of the sleeve almost from end to end thereof. The ported end of the sleeve is internally threaded at 110, and a capacity plate 111 is threaded within said ported end. A stem 113 is fixedly connected at the top of housing 101 and projects downwardly into the sleeve centrally thereof. This stem extends through and is slidably connected to the capacity plate. In this example, the stem is squared in cross section and slidably fits through an opening 115 of the same cross section formed in the plate centrally thereof.

A passage 116 extends through the wall of body 97 from the inlet 98 to a point above sleeve 96 to help equalize the fluid pressure on opposite sides of capacity plate 111.

A valve plate 117 is positioned near the lower end of the sleeve and overlaps the seat 104. The valve plate has a central hub 118 projecting upwardly and downwardly therefrom. The upper end of the hub is connected by radiating arms 120 to the lower end of sleeve 96, said arms forming spaces therebetween through which a fluid may flow. The lower end of the hub is formed with a slot 123 for receiving a screwdriver or other instrument, by means of which said hub, the valve plate and the sleeve may be rotated. A plug 126 removably closes the bottom of valve 97. It will be understood that the hub may extend through a packing gland in the plug so that the capacity plate may be moved from outside the valve.

It is necessary to provide means for causing the valve plate 117 to float with the floating piston or the like, not shown, of valve body 97. This may be done by means of a yoke 130 which extends around housing 101 and has a lower horizontal portion 131 which extends beneath valve plate 117. Hub 118 extends downwardly through an opening 133 formed in the horizontal portion 131 of the yoke. Said yoke has an upper horizontal portion 135 with a stem 136 which extends upwardly to connect with the floating piston or the like of the body 97.

The valve of Figures 8 to 10 operates in the same manner as the previously-described valves. Valve plate 117 floats with the control piston or the like of the valve body 97, and it may be adjusted towards and away from seat 104 in order to adjust the outlet pressure of the valve. When it is desired to change the valve capacity, the plug 126 is removed and hub 118 rotated. This turns sleeve 96 to move the capacity plate 111 up or down, depending upon the direction of rotation, and this adjusts the effective size of ports 108. The valve plate may be kept well away from its seat by adjusting the valve and capacity plates relative to each other.

What I claim as my invention is:

1. In a fluid valve having an inlet, an outlet, moving means for reducing pressure which is controlled by outlet fluid pressure, and adjusting means for the moving means; a pressure and capacity regulating inner valve comprising in combination a sleeve, a seat at one end of the sleeve through which fluid flows from the inlet to the outlet, a valve plate at the seat, means connected to the plate to cause the latter to move with the moving means, said plate being moved towards and away from the seat to regulate and maintain the outlet pressure, said sleeve having a plurality of longitudinally-extending elongated ports in its wall near the end thereof remote from the valve plate, the ported end of the sleeve being internally threaded, a capacity plate threaded in the ported end of the sleeve, and means for turning the capacity plate to move it towards and away from the valve plate to adjust the effective size of the ports and control the amount of fluid passing through the seat in a given time to regulate the capacity of the valve independently of the regulated pressure.

2. In a fluid valve having an inlet, an outlet, moving means for reducing pressure which is controlled by outlet fluid pressure, and ajusting means for the moving means; a pressure and capacity regulating inner valve comprising in combination a sleeve having a plurality of longitudinally-extending elongated ports in its wall near one end thereof, the ported end of the sleeve being internally threaded, a capacity plate threaded in the ported end of the sleeve, a seat at the opposite end of the sleeve through which fluid flows from the inlet to the outlet, a valve plate at the seat, a stem connected to the valve plate and extending longitudinally and centrally through the sleeve and through the capacity plate therein to and movable with the moving means, said stem being mounted for axial rotation and being slidable in a longitudinal direction through the capacity plate and means connecting the capacity plate to the stem for axial rotation therewith without interfering with sliding movement therebeween, whereby longitudinal movement of the stem moves the valve plate towards and away from the seat to regulate and maintain the outlet pressure, and axial rotation of the stem in opposite directions turns the capacity plate on the thread of the sleeve to cause said plate to move towards and away from the valve plate to adjust the effective size of the ports and control the amount of fluid passing through the seat in a given time to regulate the capacity of the valve independently of the regulated pressure.

3. A pressure and capacity regulating inner valve as claimed in claim 2 including means extending into the valve for turning the stem to move the capacity plate.

References Cited in the file of this patent

UNITED STATES PATENTS

| 804,532 | Hansen | Nov. 14, 1905 |
| 836,306 | Cunning | Nov. 20, 1906 |
| 1,072,744 | Levick | Sept. 9, 1913 |
| 1,178,528 | Loepsinger | Apr. 11, 1916 |
| 1,543,291 | Mueller | June 23, 1925 |
| 1,841,456 | Shand | Jan. 19, 1932 |
| 2,686,534 | Montelius | Aug. 17, 1954 |

FOREIGN PATENTS

| 117,816 | Germany | Oct. 21, 1900 |
| 206,639 | Germany | Feb. 11, 1909 |
| 566,760 | Germany | Dec. 21, 1932 |